No. 698,325. Patented Apr. 22, 1902.
H. W. SCATTERGOOD.
SPONGE OR MUCILAGE HOLDER.
(Application filed Mar. 7, 1901.)

(No Model.)

Witnesses:
A. M. Joug.
Howell Bartle.

Inventor.
Henry W. Scattergood.
by Wm. H. Finckel.
Atty.

UNITED STATES PATENT OFFICE.

HENRY W. SCATTERGOOD, OF PHILADELPHIA, PENNSYLVANIA.

SPONGE OR MUCILAGE HOLDER.

SPECIFICATION forming part of Letters Patent No. 698,325, dated April 22, 1902.

Original application filed July 6, 1899, Serial No. 722,907. Divided and this application filed March 7, 1901. Serial No. 50,175. (No model.)

*To all whom it may concern:*

Be it known that I, HENRY W. SCATTERGOOD, a citizen of the United States, residing at Philadelphia, in the county of Philadelphia and State of Pennsylvania, have invented a certain new and useful Improvement in Sponge or Mucilage Holders, of which the following is a full, clear, and exact description.

This case is a division of my application for patent for sponge or mucilage holders, filed July 6, 1899, Serial No. 722,907.

This invention relates to sponge or mucilage holders, and has for its object to provide a holder which will obviate the escape of the contents over the outside of the holder when the holder is being used. In carrying out this object I employ a vessel in which is suspended a removable retainer the upper edge of which projects above the level of the mouth of the vessel, the said retainer being supported within the outside vessel and communicating externally and internally with the interior of the vessel, so that any drippings, spill, or excess carried over from the retainer in use will fall back within the vessel instead of being carried on to the outside of said vessel.

Figure 1:
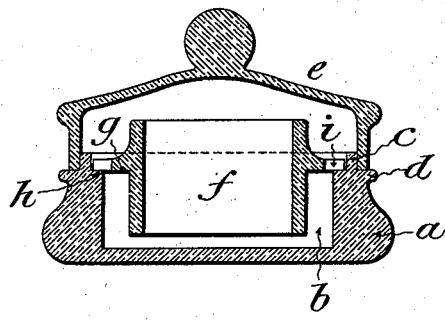
Figure 2:
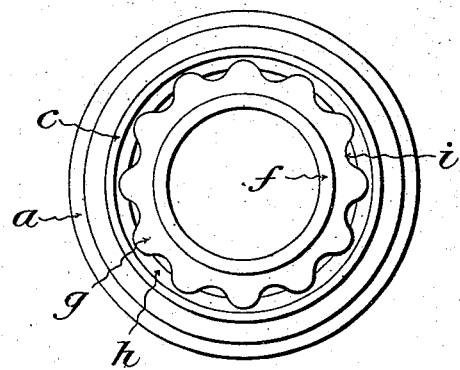
Figure 3:
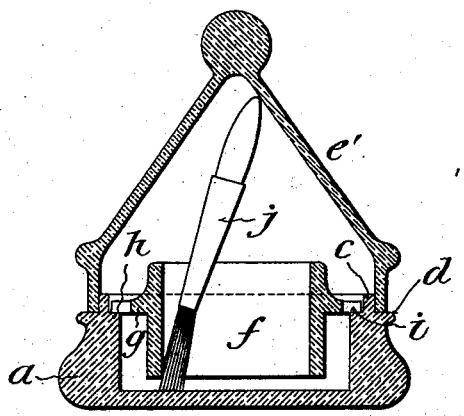
Figure 4:
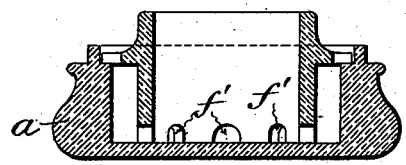

In the accompanying drawings, illustrating my invention, in the several figures of which like parts are similarly designated, Figure 1 is a vertical transverse section. Fig. 2 is a top plan view with the cover removed. Fig. 3 is a vertical transverse section having a cover of sufficient height to receive within it a brush. Fig. 4 is a vertical transverse section of a modification.

In the construction shown the outer vessel *a*, which may be of glass or other suitable material, has a cylindrical interior cavity *b* and a rim or lip *c*, shouldered at *d*, to receive a cover *e* in a substantially air-tight manner. Within this cavity is the retainer *f*, made of glass or other material in the form of a cylindrical tube and having a laterally-projecting flange *g* to rest upon an inner shoulder *h* of the outer vessel, the said retainer terminating short of the bottom of the vessel or extending to the bottom of the vessel and having notches *f'* in its lower edge, Fig. 4, and also having notches *i* in its flange *g*, the said notches *i* forming openings between the flange and the shoulder *h*, through which any excess of spill carried over from the retainer in use may be returned to the cavity.

If the device be used as a sponge-holder, then the sponge will be placed within the retainer and moistened, and the excess of moisture will be confined within the cavity of the outer vessel. It is obvious that if a stamp or envelop or other object to be moistened be dragged across the sponge or other absorbent material contained within the retainer any excess of expressed moisture carried over by such object will be discharged within the cavity *b* through the notches *i* rather than be carried over upon the outside of the vessel *a*. If the device be used as a mucilage-holder, as indicated in Fig. 3, the excess of mucilage taken by the brush *j* may be removed upon the upper edge of the retainer and will be similarly returned to the cavity of the vessel *a*, and this return of excess or spill is insured in view of the fact that the said retainer stands up within said outer vessel beyond the upper edge of its rim or lip *c*.

Whether the retainer have its bottom edge above the bottom of the cavity or the bottom of the said retainer extend to the bottom of the cavity and be notched, the circulation of the fluid from the outer vessel to the retainer is insured.

As shown in Fig. 1, a low cover may be used when the device is employed as a sponge holder or moistener, and, as shown in Fig. 3, a conical or higher cover *e'* may be used where a brush is employed.

The holders shown and described herein are useful convertibly as moisteners or mucilage or other fluid holders. In thus specifying the capabilities of the forms of the invention illustrated I do not wish to be understood as imposing limitations, but simply as instancing what may be done.

I do not wish to be understood as limiting my invention to any one particular form, but esteem as within my invention not only both of the forms herein illustrated, but others having the same general characteristics and mode of operation.

In my Patent No. 592,959, dated November 2, 1897, is shown the principle of which the present invention is another example. The present invention is an adaptation of the principle of the said patented invention to a moistener or a convertible moistener and mucilage holder; but it is obvious that the invention is not limited to the use to which the device may be put.

What I claim is—

1. A sponge or mucilage holder, comprising a vessel having an external shoulder and an adjacent lip, a cover applied to said shoulder and lip, an inner shoulder, and a tube suspended within the said vessel above its bottom by means of a laterally-projecting flange fitted to and resting upon the inner shoulder, the tube projecting above and below its said flange, substantially as described.

2. A vessel $a$, having a shoulder $d$, a cover fitted substantially air-tight to said shoulder, an adjacent rim or lip, an inner shoulder next to said rim or lip, and a tubular retainer provided with a laterally-projecting notched flange engaging the inner shoulder, the upper edge of the retainer projecting considerably above the rim or lip, and the lower tubular portion of said retainer extending toward the bottom of the vessel, substantially as and for the purpose described.

3. A vessel $a$, having an inner shoulder next to its rim or lip, combined with a tube having a laterally-projecting notched flange resting loosely upon said shoulder, the lower portion of the tube suspended above the bottom of the vessel by said flange and the upper edge of the tube projecting considerably above the mouth of the vessel, substantially as and for the purpose described.

In testimony whereof I have hereunto set my hand this 4th day of February, A. D. 1901.

HENRY W. SCATTERGOOD.

Witnesses:
H. DERINGER FALSTETH,
S. E. CARVER.